(12) United States Patent
Wonderlich et al.

(10) Patent No.: US 6,299,523 B1
(45) Date of Patent: Oct. 9, 2001

(54) MEANS FOR REMOTELY EJECTING THE BLADE OF A MEAT SKINNING MACHINE

(75) Inventors: William J. Wonderlich, Runnells; Douglas McCloskey, Altoona; David S. Hamblin, Norwalk, all of IA (US)

(73) Assignee: Townsend Engineering Company, Des Moines, IA (US)

( * ) Notice: Subject to any disclaimer, the term of this patent is extended or adjusted under 35 U.S.C. 154(b) by 0 days.

(21) Appl. No.: 09/777,759

(22) Filed: Feb. 6, 2001

(51) Int. Cl.$^7$ ........................................................ A22B 5/16
(52) U.S. Cl. ................................................................ 452/127
(58) Field of Search ..................................... 452/127, 125, 452/136

(56) References Cited

U.S. PATENT DOCUMENTS

| | | | |
|---|---|---|---|
| 3,513,893 | * | 5/1970 | Townsend ............................. 452/127 |
| 4,466,344 | | 8/1984 | Schill . |
| 4,730,376 | | 3/1988 | Yamada . |
| 5,083,973 | | 1/1992 | Townsend . |
| 5,211,097 | | 5/1993 | Grasselli . |
| 5,350,334 | | 9/1994 | Holms . |
| 5,494,478 | * | 2/1996 | Long et al. ........................... 452/127 |
| 5,660,218 | | 8/1997 | Jonkka . |
| 5,738,156 | | 4/1998 | Stewart . |
| 5,776,066 | * | 6/1998 | Ranniger ............................... 452/127 |
| 5,938,518 | * | 8/1999 | Bargele' et al. ...................... 452/127 |
| 6,030,326 | | 2/2000 | Azuma et al. . |
| 6,086,470 | * | 7/2000 | Ranniger ............................... 452/127 |

* cited by examiner

Primary Examiner—Willis Little
(74) Attorney, Agent, or Firm—Zarley, McKee, Thomte, Voorhees & Sease

(57) ABSTRACT

A mechanism for ejecting a cutting blade from a knife assembly in a meat skinning machine includes a shoe with a supporting surface for the blade and a releasable clamping assembly for clamping the cutting blade to the supporting surface. The clamping assembly includes a clamp and releasable fasteners. Together the shoe and clamp form an elongated open slot adjacent to the blade when clamped together by the fasteners. A pair of ejectors extend into the slot and are slidably mounted with respect to the shoe and the clamp so as to engage the blade. The ejectors can be pushed into the blade to eject the blade when the clamp is released. The ejectors are rigid elongated rods longitudinally spaced along the edge of the blade opposite the cutting edge. The ejector rods include a guide bulb thereon, with cam surfaces thereon to engage and lift the clamp when moved rearwardly to lift the loosened clamp from the blade.

6 Claims, 4 Drawing Sheets

MEANS FOR REMOTELY EJECTING THE BLADE OF A MEAT SKINNING MACHINE

BACKGROUND OF THE INVENTION

The present invention relates to the field of food processing machines. More particularly, this invention relates to a means for remotely ejecting the cutting blade of a meat skinning machine and holding the blade clamp open for insertion of a new blade.

Meat skinning machines have disposable razor-type blades that are extremely sharp and dangerous to handle. The blade of the meat skinning machine is typically an elongated strip of metal that includes a first edge, top and bottom surfaces, and a cutting edge opposite the first edge. Various structures for holding the blade are well known on meat skinning machines. Many of these structures utilize a rigid shoe to support the bottom surface of the blade while a blade clamp exerts a clamping force on the top surface of the blade. The cutting edge protrudes from the blade holding members and toward the meat to be skinned. One problem with these conventional blade holders is that the blade tends to adhere to the shoe or the clamp, then the operator must approach the cutting edge of the blade and use a screwdriver to pry the blade out of the holder. If the screwdriver or hand of the operator slips, the operator can be cut by the blade. The machine and the blade can also be damaged by the screwdriver during the blade removal process.

Therefore, a primary objective of the present invention is the provision of a means and method for removing a blade safely and quickly.

Another objective of this invention is the provision of an inexpensive and effective mechanism for removing a cutting blade from a food processing machine, such as a meat skinning machine. These and other objectives will be apparent from the drawings, as well as from the description and claims that follow.

SUMMARY OF THE INVENTION

This invention relates to the field of cutting blade assemblies for meat skinning machines, more particularly, a mechanism for ejecting a cutting blade from such a machine. The mechanism includes a shoe with a supporting surface for the blade and a releasable clamping means for clamping the cutting blade to the supporting surface. The clamping means includes a clamp. Together the shoe and clamp form an elongated open slot adjacent to the blade when clamped together by the clamping means. An ejector extends into the slot and is slidably mounted with respect to the shoe and the clamp so as to engage the blade and eject it when the clamping means is released.

A plurality of rigid elongated rods longitudinally spaced along the edge of the blade opposite the cutting edge can comprise the ejector. The ejector rods each include a guide bulb thereon that cooperates with a groove and cam surface formed in the shoe to more effectively dislodge the blade.

DETAILED DESCRIPTION OF THE PREFERRED EMBODIMENT

Figure 1:
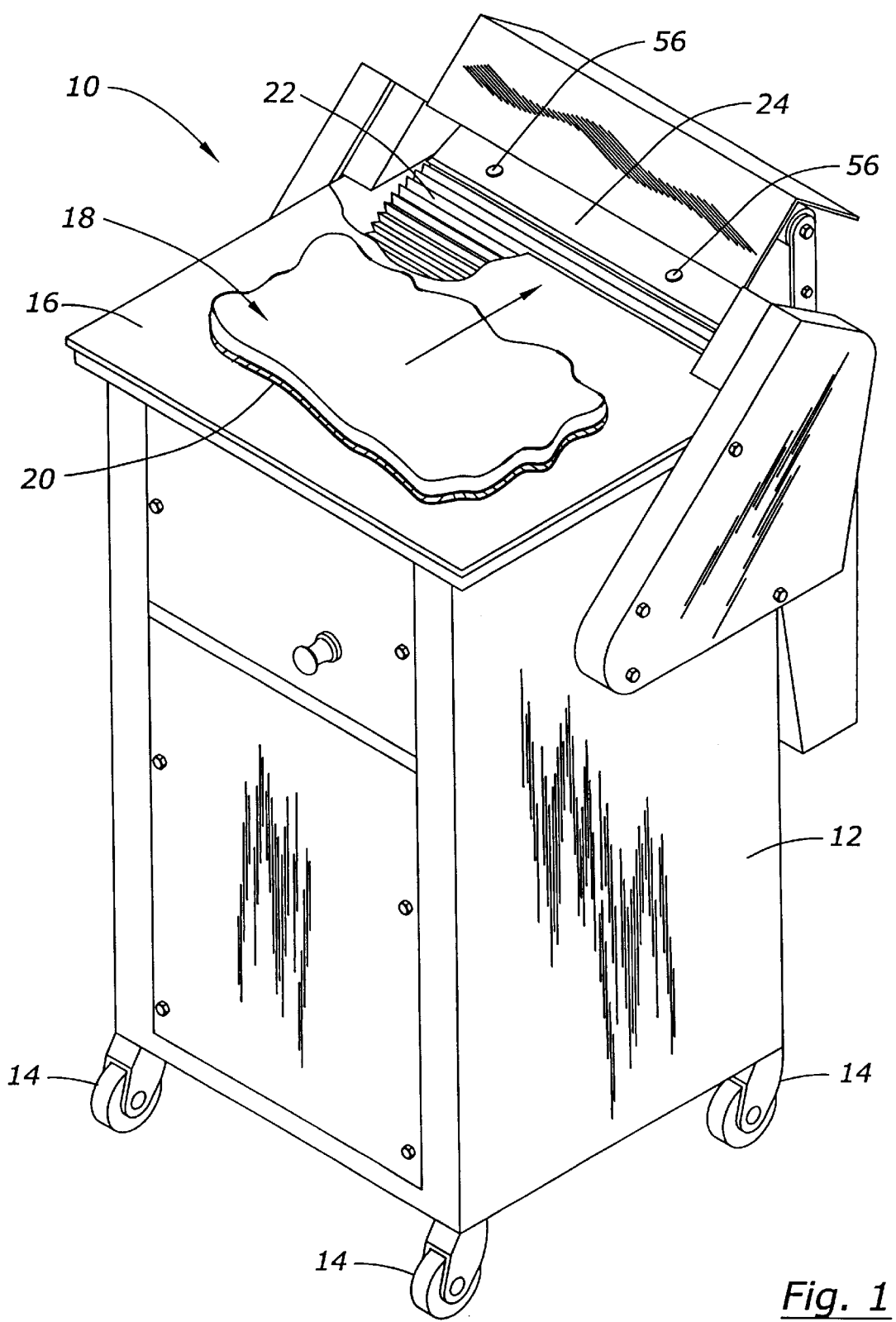
FIG. 1 is a perspective view of a meat skinning machine equipped with the blade ejecting mechanism of the present invention.

A meat skinning machine 10 is shown in FIG. 1. The meat skinning machine 10 includes a cabinet 12, which may or may not include a plurality of wheels 14 to make it mobile. The machine 10 further includes a table surface 16 for supporting a slab of meat 18 having a layer of skin 20 to be removed. The table surface 16 can be smooth or can be equipped with powered rollers to assist in feeding the slab of meat 18 into a rotary powered gripper roll 22 that is driven in a conventional manner. In FIG. 1 and the following description, the direction that the meat is fed into the machine is generally referred to as the forward direction.

Figure 2:
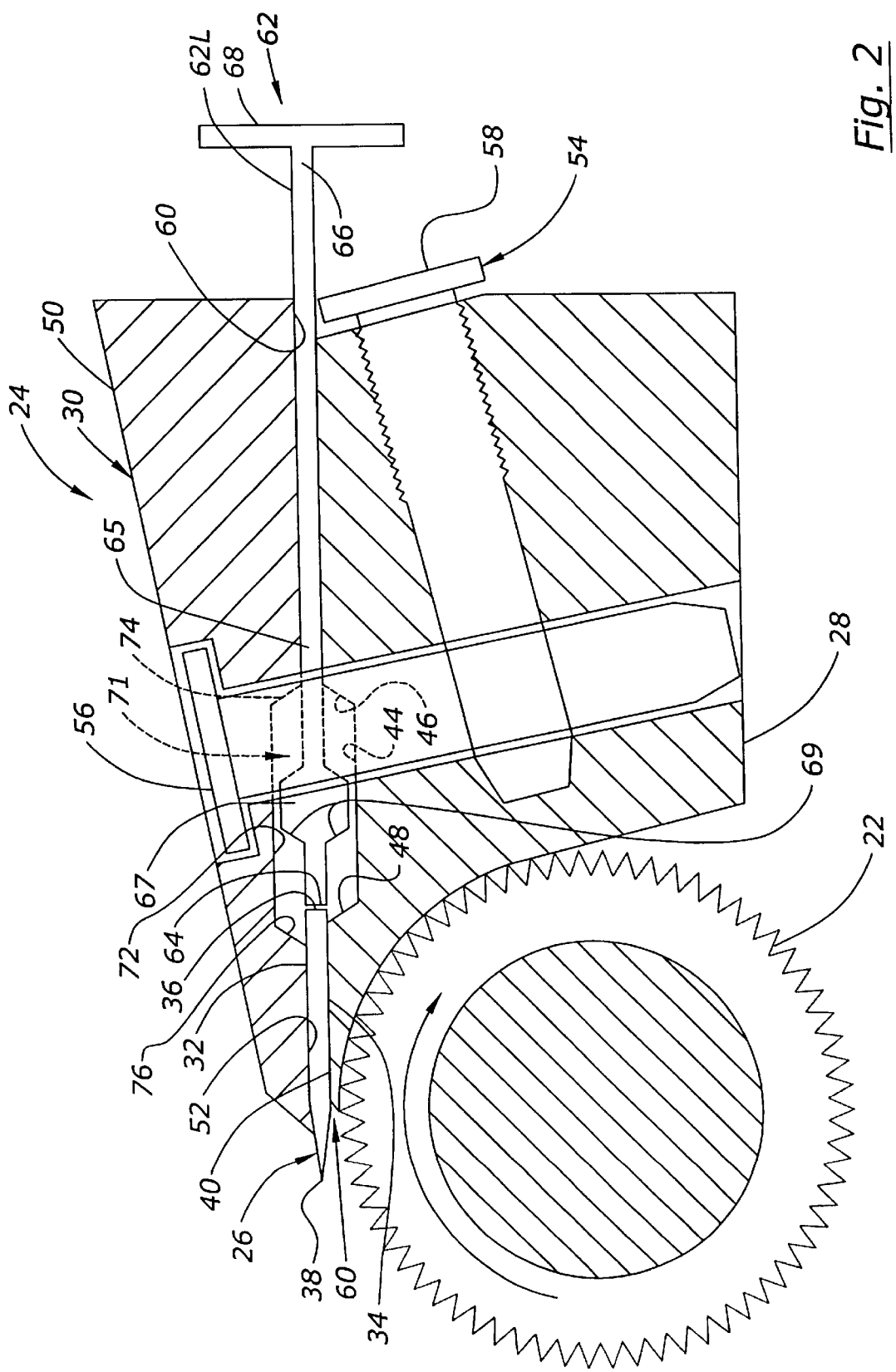
FIG. 2 is a cross-sectional view taken along line 2—2 in FIG. 4 and shows the blade ejecting mechanism when the releasable clamping means is clamped on the blade and the ejector is retracted.
Figure 3:
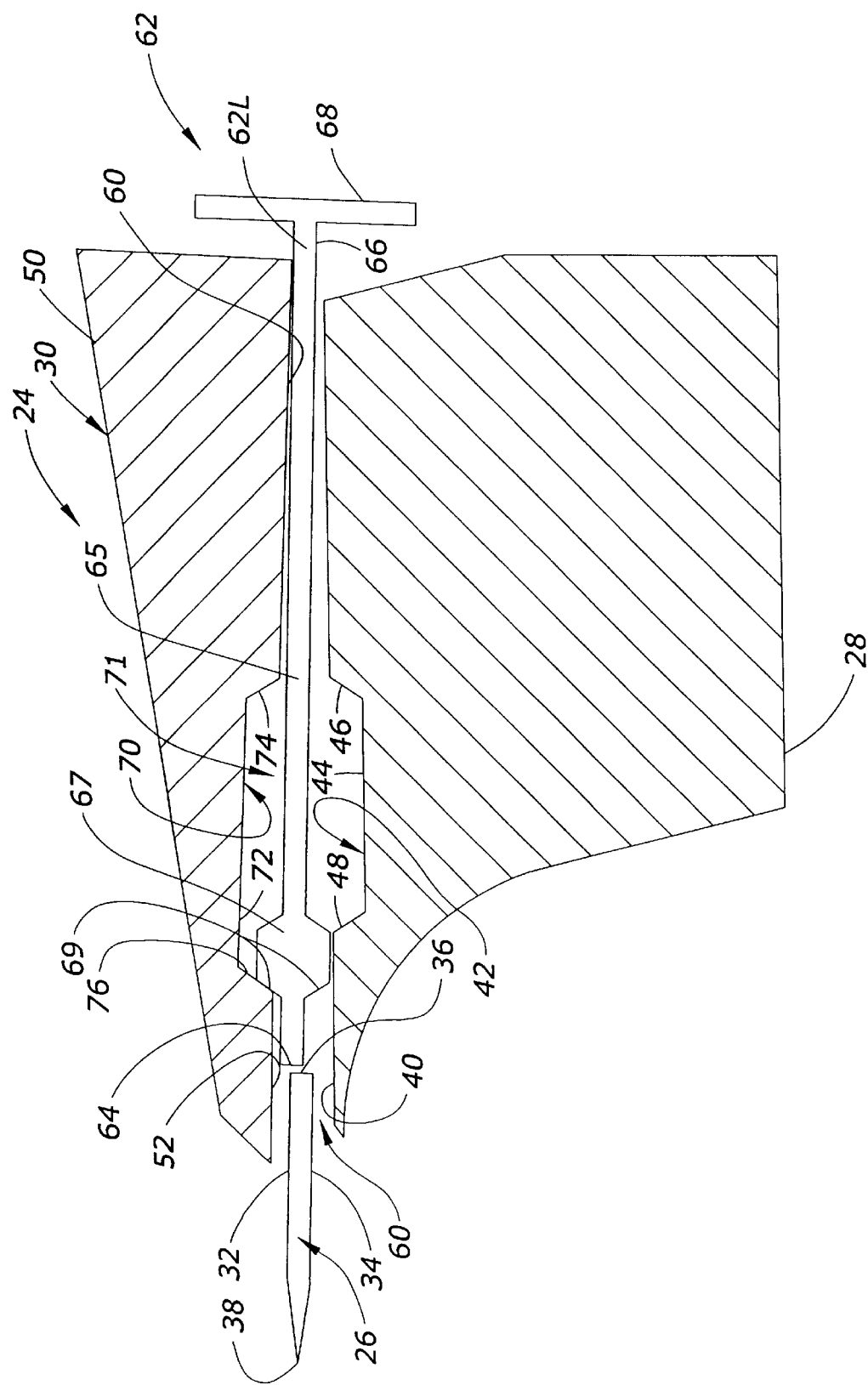
FIG. 3 is a cross-sectional view taken along line 3—3 in FIG. 4. This figure is similar to FIG. 2, but shows the clamping means released and the ejector pushed to engage and eject the blade.

As best seen in FIGS. 1–3, a knife assembly 24 is positioned closely adjacent the gripper roll 22 so as to cut the skin 20 from the desire meat product as the gripper roll 22 feeds the slab of meat 18 into the knife assembly 24. The knife assembly 24 includes an elongated cutting blade 26 mounted on a shoe 28 by releasable clamping means 30. The blade 26 has opposing top and bottom surfaces, 32, 34, which define a height or thickness therebetween. The blade 26 also has a forward edge 36 and an elongated cutting edge 38 opposite the forward edge 36.

The shoe 28 has a substantially planar surface 40 for supporting the surface 34 of the blade 26. The supporting surface 40 on the shoe 28 terminates adjacent groove 42 which extends forwardly in a longitudinal direction away from the blade 26. When the shoe is oriented as shown in the figures, the groove has a bottom wall 44, an inclined forward wall 46, and a cam surface 48. The cam surface 48 on the shoe 28 rises rearwardly and upwardly from the bottom wall 44. A straight planar inclined surface is shown in the preferred embodiment, but other geometric configurations designed to produce upward and rearward sliding deflection would also suffice without detracting from the invention.

The releasable clamping means 30 includes a clamp 50 with a substantially planar clamping surface 52 thereon directed toward the surface 32 and the supporting surface 40 of the shoe 28. The releasable clamping means 30 further includes means 54 for releasably fastening the clamp 50 and the shoe 28 together so as to clamp the cutting blade 26 between them. In the preferred embodiment shown, a conventional lock pin 56 is engaged by a lock screw 58 (FIG. 2). The shoe 28 and the clamp 50 form an elongated slot 60 for receiving the blade 26 when secured together.

Figure 4:
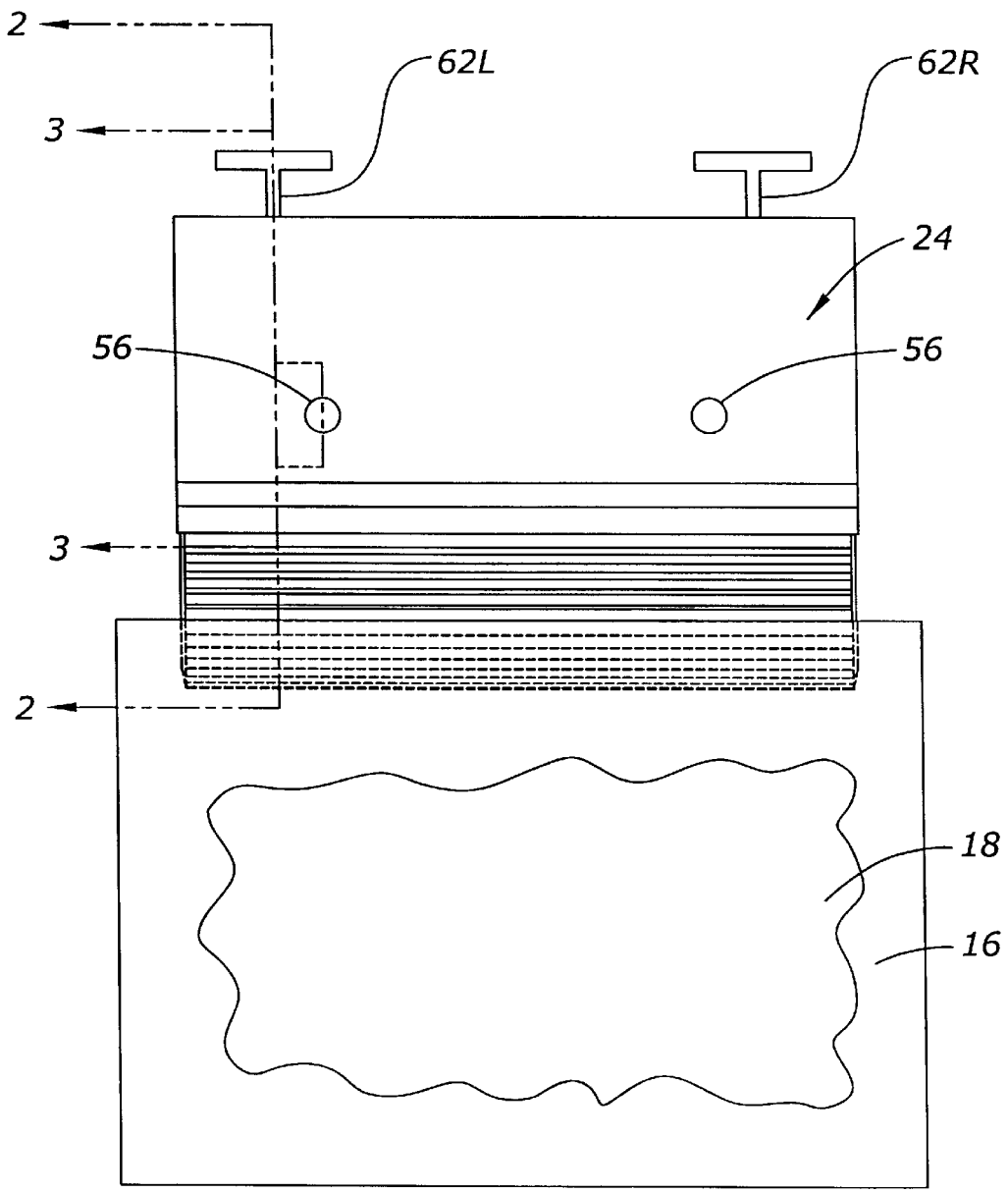
FIG. 4 is a top plan view of the meat skinning machine of FIG. 1 with the deflector shield removed to expose the ejector rods and their handles.

An ejector 62 extends into the slot 60 and is slidably mounted with respect to the shoe 28 and the clamp 50 so as to engage the blade 26, preferably only at its forward edge 36. The ejector 62 can be pushed to engage and eject the blade 26 from the shoe 28 and the clamp 50 when the clamping means 30 is released. The ejector 62 comprises a pair of rods 62L, 62R spaced longitudinally along the blade 26 near its ends, as shown in FIG. 4. The ejector rods 62L, 62R have been found to produce superior results in terms of low friction, material savings, and cost. Ejector rods 62L, 62R are identical, therefore only rod 62L is described in detail below and shown in FIGS. 2 and 3.

Ejector rod 62L is a rigid, elongated, and cylindrical rod that includes opposite ends 64, 66 with an intermediate portion 65 located therebetween. The outer diameter of the end 64 is approximately the same as the height of the blade 26. The end 64 of the ejector 62L registers with the forward edge 36 of the blade 26 upon initial engagement therewith. The end 66 of the ejector rod 64L includes an enlarged handle that is in the form of a push knob 68, which is exposed because the end 66 of the ejector 62 extends beyond the shoe 28 and the clamp 50. The intermediate portion 65 of the ejector rod 62L includes a radially enlarged guide bulb 67 thereon, which is cylindrical and has a tapered conical surface 69 directed toward the end 64 of the ejector 62.

The clamp 50 has a groove 70 formed therein, which superposes over the groove 42 in the manner shown in FIGS. 2 and 3 to form a socket 71. Like the groove 42, the groove 70 extends in a longitudinal direction with respect to the blade 26. When the clamp 50 is oriented as shown, the groove 70 has a top wall 72, a tapered wall 74 and a tapered wall 76.

The walls 46 and 74 of the grooves 42 and 70 are aligned so that they are directly above and below each other. In the assembled and operating position, the cutting blade 26 is positioned on the supporting surface 40 with its forward edge 36 abutting the ends 64 of the ejectors 62L, 62R. The clamp 50 is on top of the blade 26 and the clamp 50 is clamped on the blade 26 by the lock pins 56 and the screws 58. The ejectors 62L, 62R are prevented from being completely pulled rearwardly out of the knife assembly because the walls 46, 74 of the grooves 42 and 70, respectively, stop the guide bulb 67 from withdrawal. The push knobs 68 limit the movement of the ejectors 62L, 62R in the other direction.

To remove the cutting blade 26, the clamping means 30 is released by the loosening lock screws 58 and the lock pins 56. The operator then pushes the push knobs 68 on the ejectors 62L, 62R. As the ejectors 62L, 62R move rearwardly in the slot 60, their ends 64 contact the blade 26 (if they are not already in contact with it). The ejectors 62L, 62R push the blade 26 in a rearward direction until the conical surfaces 69 of the guide bulbs 67 engage the cam surfaces 48 of the groove(s) 42 in the shoe 28. As the guide bulbs 67 slide against the cams defined by the surfaces 69, the ends 64 of the ejector rod 62L, 62R are deflected upwardly to "open" slot 60, which also forces the clamp 50 upwardly to dislodge the blade 26. Eventually the ejector rods 62L, 62R will reach the position illustrated in FIG. 3 wherein resistance to rearward travel occurs. Thus, the blade 26 has been dislodged from the clamping surface 52 and the supporting surface 40 so that it can be quickly, safely and easily disengaged from machine 10 without the operator's hands coming in proximity with the cutting edge of the blade during the process. The clamp is also held open ready for the insertion of a new blade.

Thus, it can be seen that the present invention achieves its stated objectives.

What is claimed is:

1. A mechanism for ejecting a cutting blade from a meat skinning machine, the cutting blade including opposing upper and lower surfaces, a forward edge, and an elongated cutting edge opposite the forward edge, the mechanism comprising:

a shoe including a supporting surface thereon for supporting the lower surface of the blade;

releasable clamping means including a clamp having a clamping surface thereon directed toward the upper surface of the blade, and means for releasably fastening the clamp and the shoe together so as to clamp the cutting blade between the supporting surface and the clamping surface;

the shoe and the clamp, when clamped together on the blade by the clamping means, forming an elongated slot therebetween for receiving the blade such that the forward edge of the blade is disposed in the slot; and an ejector slidably extending toward the slot so as to engage the blade at the forward edge thereof;

whereby the ejector can be pushed rearwardly thereby ejecting the blade and releasing the blade from the shoe and the clamp when the clamping means is released.

2. The mechanism of claim 1 wherein the ejector comprises a pair of rigid elongated ejector rods disposed in the slot, the rods extending transverse to the blade and being spaced longitudinally along the blade.

3. The mechanism of claim 2 wherein an open socket is formed between the shoe and the clamp in communication with the slot and having a greater cross-sectional size than the slot, the ejector extending through the socket and having a guide bulb thereon, cam surfaces being formed on the bulb and the socket to lift the clamp upon rearward movement of the ejector.

4. The mechanism of claim 3 wherein a cam surface on the shoe rises upwardly toward the slot such a rearward end of the rod and the clamp are deflected upwardly when the guide bulb slides against the raised rearward cam surface.

5. The mechanism of claim 4 wherein guide bulb is cylindrical and has a rearwardly tapered conical surface directed toward the rearward end of the rod.

6. A mechanism for ejecting a cutting blade from a meat skinning machine, the cutting blade including forward and rearward surfaces, a forward edge, and an elongated cutting edge opposite the forward edge, the mechanism comprising:

a blade support member having a surface thereon for supporting the blade;

releasable clamping means including a blade clamp and means for releasably fastening the blade clamp and the blade support together so as to clamp the cutting blade therebetween;

the blade support member and the blade clamp, when clamped together on the blade by the clamping means, forming an elongated slot therebetween for receiving the blade;

an ejector slidably extending into the slot opposite the forward edge of the blade so as to engage the blade at the forward edge of the blade; and cam means on the blade support member and the ejector for deflecting the ejector into the blade clamp when the clamping means is released and the ejector is pushed rearwardly so as to separate the blade clamp from the blade.

* * * * *